US008679378B2

(12) United States Patent
Goldstein et al.

(10) Patent No.: US 8,679,378 B2
(45) Date of Patent: Mar. 25, 2014

(54) LASER SINTERING OF CERAMIC FIBERS (75) Inventors: Jonathan Goldstein, Cincinnati, OH (US); Geoff Fair, Centerville, OH (US); Heedong Lee, Centerville, OH (US); HyunJun Kim, Beavercreek, OH (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 261 days.

(21) Appl. No.: 13/212,422

(22) Filed: Aug. 18, 2011

(65) Prior Publication Data
US 2013/0043606 A1 Feb. 21, 2013

(51) Int. Cl.
B29D 11/00 (2006.01)

(52) U.S. Cl.
USPC ....... 264/1.22; 264/1.21; 264/1.27; 264/1.37; 264/639; 264/640; 425/174.4; 425/377

(58) Field of Classification Search
USPC .............. 264/1.21, 1.24, 1.37, 497, 482, 670, 264/1.22, 1.27, 409, 638, 639, 640; 425/174.4, 377, 404; 219/121.6, 219/121.72
See application file for complete search history.

(56) References Cited

U.S. PATENT DOCUMENTS

| 4,490,319 A | 12/1984 | Lee et al. |
| 4,902,459 A * | 2/1990 | Matsubara et al. ........... 264/670 |
| 6,717,106 B2 | 4/2004 | Nagano et al. |
| 2011/0034319 A1 * | 2/2011 | Villalobos et al. ............ 501/152 |

FOREIGN PATENT DOCUMENTS

CN 101041587 * 9/2007

* cited by examiner

Primary Examiner — Mathieu D. Vargot
(74) Attorney, Agent, or Firm — AFMCLO/JAZ; Charles Figer, Jr.

(57) ABSTRACT

A method and system for generating an optical fiber is provided. The method includes creating a green fiber consisting primarily of a ceramic material and sintering the green fiber with a laser by moving the green fiber through a beam of the laser to increase the density of the fiber after sintering. The system for creating a continuous optical fiber includes an extruder, a processing chamber and a laser. The extruder is configured to extrude a ceramic slurry as a green fiber. The processing chamber is configured to receive and process the green fiber. And, the laser is configured to direct a laser spot on the green fiber exiting the processing chamber to sinter the green fiber.

21 Claims, 6 Drawing Sheets

LASER SINTERING OF CERAMIC FIBERS

RIGHTS OF THE GOVERNMENT

The invention described herein may be manufactured and used by or for the Government of the United States for all governmental purposes without the payment of any royalty.

FIELD OF THE INVENTION

The present invention relates to sintering ceramics, and more particularly to laser sintering of ceramic fibers.

BACKGROUND OF THE INVENTION

Lasing media in fiber format enjoys an advantage of high surface-to-volume ratio, resulting in efficient cooling, and consequent preference over other geometries for high power applications. Thus, fiber lasers rank prominently among the highest power lasers in existence today, with some producing beams of over ten kilowatts in power. Further, a fiber waveguiding configuration can be structured to allow only a single mode of light output from the laser, resulting in superior beam quality relative to other geometries. Additional advantages of fiber waveguide laser geometry, insofar as the use of free-space optics is reduced or even eliminated, can include resistance to misalignment due to vibration or temperature fluctuations, ease of alignment, and compactness.

Having arrived at such high powers from the contemporary fiber laser material, i.e., silica, the ability to produce even higher powers has begun to become limited by the fundamental material properties of that lasing media. Thus, other materials possessing qualities superior to those of silica for purposes of fashioning fiber lasers are needed. Ceramic materials are strong candidates for this purpose. Several compounds are prominent among this class of materials as having unique potential to serve as useful high-power laser materials, for example, lutetium oxide (or Lutetia), yttria, and yttrium aluminum garnet ($Y_3Al_5O_{12}$ or YAG). These materials are expected to be preferable to silica as fiber lasing media for two reasons related to their inherent material properties. First, the thermal conductivities of these materials are higher than those of silica. A higher thermal conductivity allows for waste heat to be extracted from the active lasing media more efficiently. Second, these materials typically permit higher levels of dopant to be introduced into their matrices than does silica. Higher dopant levels may result in achieving the same degree of absorption as in silica, while using shorter lengths of fiber relative to silica. This may be useful due to the fact that Stimulated Brilloiun Scattering, or SBS, a phenomenon which is deletrious to efficient high-power laser operation, is more prone to occur in longer lengths of fiber. SBS is a major concern to producers of higher power fiber lasers.

Presently, optical-quality YAG fiber has been created in single crystal form, only. However, ceramic fibers of these materials may be more desirable. The single crystal forms of these materials are more limited in their ability to incorporate high concentrations of certain dopants such as Neodymium, than the polycrystalline ceramic forms. Additionally, the methods by which single crystal fibers are produced—such as Laser Heated Pedestal Growth (LHPG), and Edge-Defined Film-Fed Growth (EDF, or EDFG)—generally cannot produce a fiber of diameter much less than 100 microns. This is due primarily to the fact that growth of single-crystals passes through a liquid phase, and when liquid phases of these materials are created with such small dimensions, capillary instabilities cause the liquid neck to collapse into a drop. However, in order to create fibers capable of delivering single mode beams, fibers with diameters on the order of 20 microns or less are desirable. Extrusion, may be one practical method to create ceramic fibers of such small diameters.

In any optical material, optical loss due to scatter must be minimized. In a ceramic optical material, scatter typically originates at the grain boundaries. Optical scattering at grain boundaries of a ceramic depends on three things: index isotropy, homogeneity or absence of additional phases, and porosity. If the optical indicatrix is nonspherical, scatter will generally occur at grain boundaries as the light moves from one domain to another and experiences a change in the index of refraction. Therefore, hexagonally-close-packed materials, such as Sapphire, are typically unattractive as optical ceramics. However, for materials of cubic symmetry, such as those mentioned earlier, the light sees the same index of refraction as it moves from one domain to another, and so no refractive scatter is produced. Any optical inhomogeneity present at the grain boundary, such as a pore, or a different phase, will cause scatter.

Using appropriate preparation for both oxide and non-oxide bulk polycrystalline laser materials, a ceramic optic can be made of sufficiently low scatter as to be useful as a laser optical component. Commercially available examples include ZnSe and YAG. While the size of the grains themselves are irrelevant to scatter, they may have implications for the physical strength of the material, with smaller grains typically resulting in ceramic parts of greater strength and larger grains producing weaker strengths. For purposes of fabricating a fiber, smaller grains may also result in a smoother surface on the fiber than larger grains. Insofar as light can scatter from index inhomogeneities on the waveguide surface, large grain sizes in ceramic waveguides will be likely to "indirectly" result in increased scatter, in the absence of a polishing technique for smoothing the waveguide surface.

However, preparation of a pore-free ceramic is not trivial. Due to the thermodynamics of atomic mass-transport, the grains of a ceramic will change in size and shape when the material is heated. Depending on the initial porosity of the ceramic, and in consideration of various other factors such as the surface tension of the material's liquid phases, the possible presence of eutectics, the ambient pressure, and the heating rate, a given heating regimen may cause pores to either grow and increase in size, or to shrink and perhaps even to disappear entirely. Which direction the material takes depends on the details of that material's thermodynamics, in relation to the particulars of the heating regimen employed. The technical term used to describe such a pore-closing heating regimen is "sintering". During sintering, the pores are more likely to disappear if the initial pre-sintering porosity of the ceramic is lower. Pores are generally less likely to disappear if the pre-sinter porosity is high. The initial grain size may also be a factor in pore elimination, with smaller grains being more likely to result in pore elimination than larger grains for identical initial porosities.

Creating a ceramic part of low initial, pre-sinter porosity involves considerable optimization of material chemistry and initial grain size. The net result of those preparations is an object termed a green body, which is a ceramic part in the approximate shape of the desired final geometry. This green body may have appropriately low initial porosity, and may also contain the presence of binders, or chemical materials needed solely for the purpose of holding the initial grains together, in their "green", pre-sintered, state.

Generally, heating for the sintering process is accomplished using a furnace. One of the factors which promotes the elimination of pores during a sinter is pressure of a gas or air around the part. In some cases, it has been found that sintering a part, while the part is "immersed" in a high-pressure gas, is beneficial for elimination of the pores. An explanation for this phenomenon is not so much that the pressure simply presses the grains closer together. Rather, the pressure provides a thermodynamic potential which motivates pore elimination. In order to harness this reality for the purpose of effective sintering, a Hot Isostatic Press, or HIP furnace may be utilized. A HIP is a furnace equipped with a high-pressure enclosure.

In other cases it has been found that sintering the ceramic in a vacuum may also be beneficial for pore elimination. An explanation for pore elimination in a vacuum is that if the ceramic part is in a vacuum, then the pores within the ceramic part should be empty of gas. If there were no vacuum, then the gasses in the pores must at some point dissolve into the solid in order for the pore to be eliminated. However, if a vacuum is present, then there is no gas or other matter that requires dissolution into the solid, so pore closure should occur more readily. In the event that vacuum sintering is found to be preferable, one would typically use a vacuum furnace.

However, high costs are associated with using such furnaces, including replacement costs of heating elements with finite life spans. Additionally, processing chambers sizes of these furnaces, which provide the high pressures or vacuums, limit the sizes of fibers that may be processed. What is needed, therefore, is a low cost system and method for generating ceramic fibers for laser or other applications without the limitations and challenges set out above and using processes that may be performed at atmospheric pressure.

SUMMARY OF THE INVENTION

Embodiments of the invention address the need in the art by providing a method of generating an optical fiber. A green fiber consisting primarily of a ceramic material is created. The green fiber is then sintered with a laser by moving the green fiber through a beam of the laser to increase the density of the fiber after sintering. The resulting density of the fiber after sintering is greater than 99 percent dense.

In some embodiments, creating the green fiber includes spinning a viscous pre-ceramic polymer/nanopowder mixture to create the green fiber. In other embodiments, creating the green fiber includes creating a slurry consisting of the ceramic material and extruding the slurry through a die to create the green fiber. The slurry in some embodiments includes a ceramic nanopower, a binder, and a liquid. The ceramic nanopowder may include YAG or both YAG and a dopant. The binder may include polyethylenimine. In some embodiments, prior to sintering the green fiber, the green fiber may be processed to remove the binder and the liquid.

As the green fiber is moved through the beam of the laser, a portion of the green fiber is held in the beam of the laser for an amount of time to sinter the portion of the green fiber before moving a next portion of the green fiber into the beam of the laser. In some embodiments, the amount of time is approximately one minute.

Embodiments of the invention also provide a system for creating a continuous optical fiber. In these embodiments, the system includes an extruder configured to extrude a ceramic slurry as a green fiber, a processing chamber configured to receive the green fiber, and a laser configured to direct a laser spot on the green fiber exiting the processing chamber to sinter the green fiber. The processing chamber is configured to process the green fiber to remove the binder and the liquid. In some embodiments, the system further includes an additional laser configured to direct a laser spot in conjunction with laser spot of the first laser on the green fiber exiting the processing chamber to sinter the green fiber.

In an alternate embodiment of the system for creating a continuous optical fiber, a first laser is configured to direct a first laser spot on the green fiber exiting the extruder and further configured to create a first temperature for calcining the green fiber. Subsequently, a second laser may be configured to direct a second laser spot on the green fiber after calcining and may further be configured to create a second temperature for sintering the green fiber. As with previous embodiments, the density of the fiber after sintering is greater than 99 percent dense. Additional laser spots from additional lasers may be used in conjunction with second laser spot of the second laser on the green fiber for sintering the green fiber.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Single crystal YAG has been a commercial material of choice as a laser host for neodymium (Nd) and other active ions. Ceramic (dense polycrystalline) YAG is known to have significant benefits over single crystal forms, such as, for example, a high doping concentration. Fibers are known to be ideal geometries for laser hosts, as they offer a maximal surface area to volume ratio for efficient heat extraction. A ceramic YAG in fiber geometry would combine both these advantages for fiber laser applications. Embodiments of the invention provide a system and method capable of creating a ceramic YAG body in fiber geometry.

Conventional approaches to sintering ceramics include atmospheric furnaces, Hot Isostatic Press (HIP) furnaces, and vacuum sintering. All three of these sintering options require expensive devices. Lifetimes of furnace heating elements are finite, and once worn out, they are expensive to replace. A typical furnace in a laboratory setting, used daily to 1500 C, will probably need its elements replaced every six months. HIP and Vacuum furnaces are also large, requiring room for pumps and/or gas storage and compression. Lasers are advantageous in all these respects. The footprint of a $CO_2$ laser, for example, can be less than one square foot in some configurations, and it's price may be less than one tenth that of a HIP. $CO_2$ lasers have lifetimes of tens of thousands of hours. Furthermore, while laser sintering may be performed at ambient atmospheric pressures, if it should ever be desired, lasers may also be used for sintering a part under vacuum or pressure, by feeding the beam into a pressure or vacuum vessel with an appropriate window.

Besides the advantages in space and cost, a laser offers other advantages as well. Whereas the heating rate in conventional furnaces using resistive heating elements is at most a few degrees per minute, use of a laser to heat a fiber allows heating rates of hundreds of degrees per second. Sintering under such rapid heating rates is empirically known to result in improved results in bulk samples, and has been implemented in a technique known variously as spark-plasma-sintering (SPS), current-assisted sintering, or field assisted sintering. In this bulk sintering technique the part is pressed between two graphite dies, and a large current is run through the dies. Thus, the part is heated by the die. This methodology does often produce distinctively advantageous results: very fast full, densification (for example, 10 minutes instead of 10 hours), with negligible grain growth.

Utilizing embodiments of the invention, densification of an extruded fiber green body is possible by laser action at atmospheric pressure. These embodiments provide the possibility of creating a fully dense fiber with a low cost and easily implemented method. Laser sintering also offers the possibility if minimizing contamination of the fiber, as other sintering techniques require the large surface areas of furnaces and presses to be heated and exposed to the fiber, whereas with laser processing it is only the fiber itself, which is heated. Laser sintering also lends itself easily to implementation in a vacuum environment, to achieve vacuum laser sintering. This sintering method may also be applicable to fibers of other ceramic systems as well, such as lutetia and many others.

Figure 1:
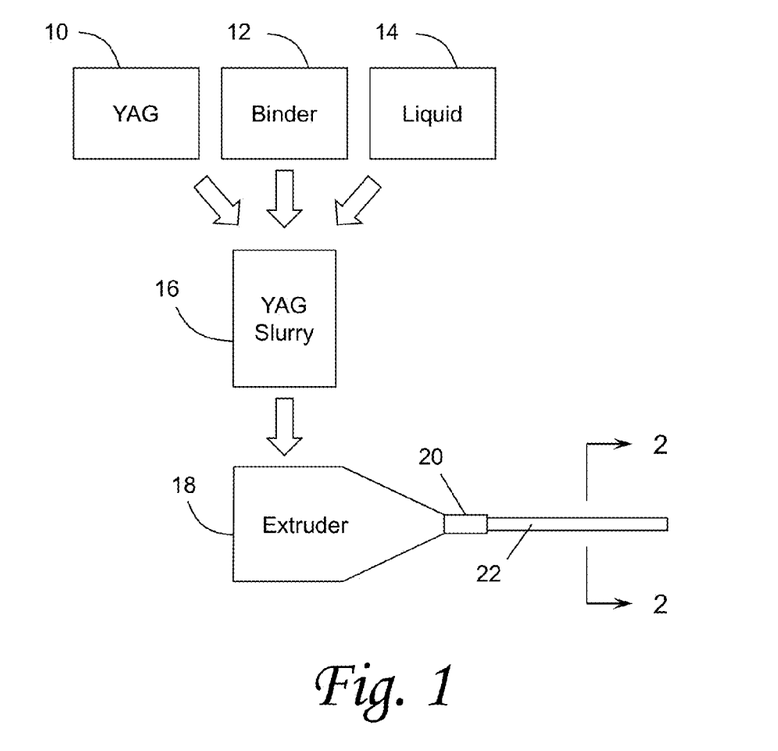
FIG. 1 is a schematic diagram of an extrusion process for generating green fibers.
Figure 2:
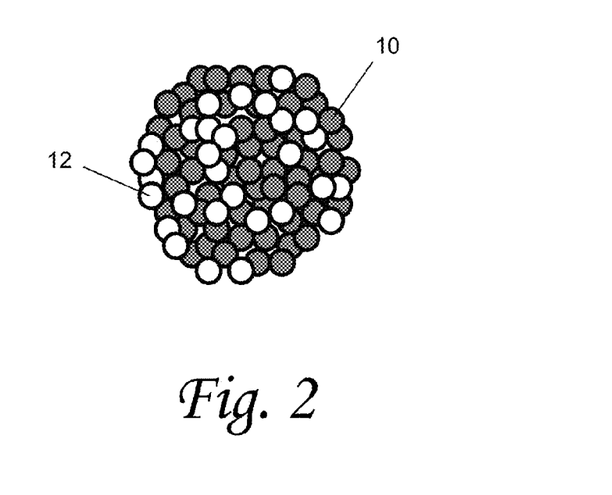
FIG. 2 is a diagrammatic cross section of the extruded green fiber of FIG. 1.

In some embodiments, short lengths of low scatter material with cladding and doping may be produced, demonstrating efficient lasing. In this context, two specific embodiments define processes to produce fine diameter (less than 75 μm) polycrystalline ceramic fibers. In a first embodiment and referring to FIGS. 1 and 2, high purity commercially available YAG nanopowders 10, such as those produced by Nanocerox, Inc. of Ann Arbor, Mich., are mixed with binder 12 and liquid 14 to form a slurry 16. The liquid 14 may include water, hydrocarbon solvents, or other liquids known in the art. Binders 12 may include polyethylenimine, such as that produced by Sigma-Aldrich, Co. of St. Louis, Mo., though other binders may also be used. A rheology of the slurry 16 may be adjusted to a high viscosity shear-thinning state. The extrusion mix showed favorable shear thinning behavior when it contained approximately 25 wt % to 35 wt % water. A resulting paste is then extruded by extruder 18 through a small diameter (30-100 μm) die 20 to produce a green fiber 22.

Alternately, and in a second embodiment, high purity commercially available YAG nanopowder 10 may be added to a preceramic polymer consisting essentially of a high molecular weight polymer, a chelating agent, and an yttrium salt. Additionally, an alumina sol may be added to this mix to maintain approximately a 3:5 ratio of yttrium to aluminum cations. The mixture may then be heated and cooked down to a tacky high viscosity mass suitable for spinning fibers in order to generate green fibers 22. Conversely, the green fiber 22 may also be drawn from a suitable mixture.

Figure 3:
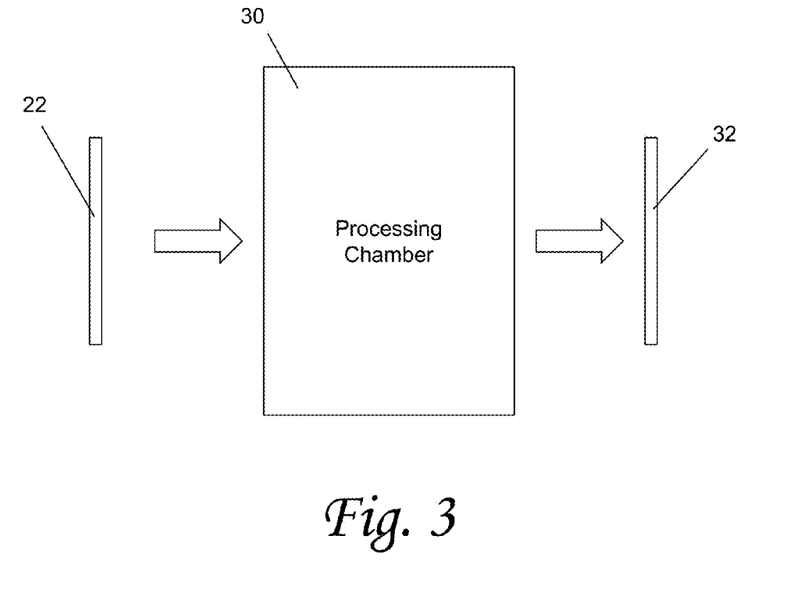
FIG. 3 is a schematic diagram of a processing step for the extruded green fiber of FIG. 1.
Figure 4A:
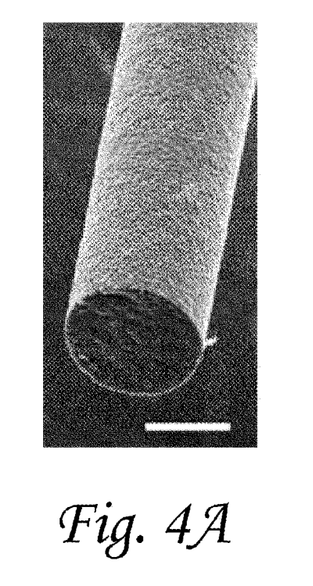
FIGS. 4A and 4B are reproductions of scanning electron microscope images of green fibers after sintering.
Figure 4B:
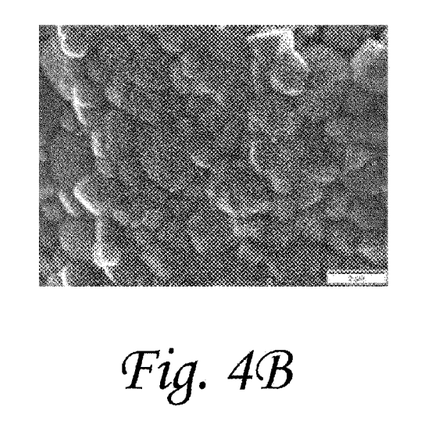

Traditional methods of densifying green bodies usually include applying high isostatic pressures and temperatures for periods of several hours. Prior to this sintering process, and in some embodiments, the green fiber 22 may be placed in one or more processing chambers 30 for evaporating the liquid and calcining the green fiber 22 to remove the binding agent, leaving only the YAG material and any dopants in the green fiber 32 as illustrated in FIG. 3. Sintering assists in densifying the fiber material, essentially eliminating the gaps as can be seen in FIGS. 4A and 4B. However, due to the limited volume of traditional high pressure chambers, these methods are not well suited to densification of fiber lengths greater than a few centimeters at most.

Figure 5:
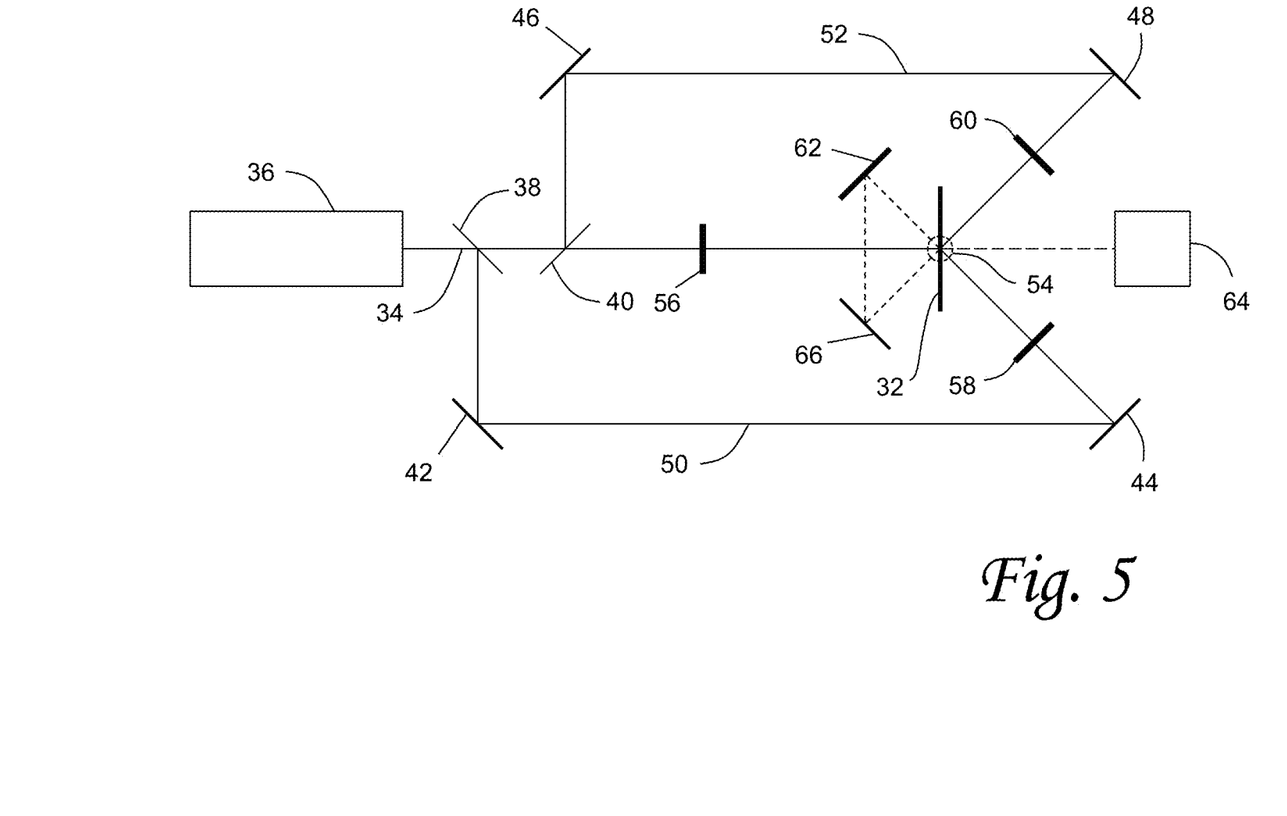
FIG. 5 is a schematic diagram of an exemplary laser configuration for sintering the green fiber in FIG. 1.

Green fiber 32 was sintered by heating in a 10 micron $CO_2$ laser beam, to which YAG is entirely opaque, impinging the beam perpendicular to the fiber's axis as illustrated in the diagram in FIG. 5. In the exemplary embodiment illustrated in FIG. 5, a beam 34 from a $CO_2$ laser 36 is split with beam splitters 38, 40 toward mirrors 42-48, which are used to direct the split beams 50, 52 toward a common spot 54 through ZnSe optics 56-60 to obtain a circular spot 54 size of approximately 1.4 mm in diameter. Additional components such as a beam blocker 62, detector 64, and additional mirrors 66 may also be used in the configuration. It will be appreciated that other laser configurations and types may be employed. Additionally, spot sizes may be adjusted to accommodate the diameters and sizes of the green fibers 32. The green fiber 32 travels through the beam's spot 54 such that sintering times are approximately one minute, though sintering times may vary again based on the diameters and sizes of the green fibers 32.

Figures 6, 7, 8:
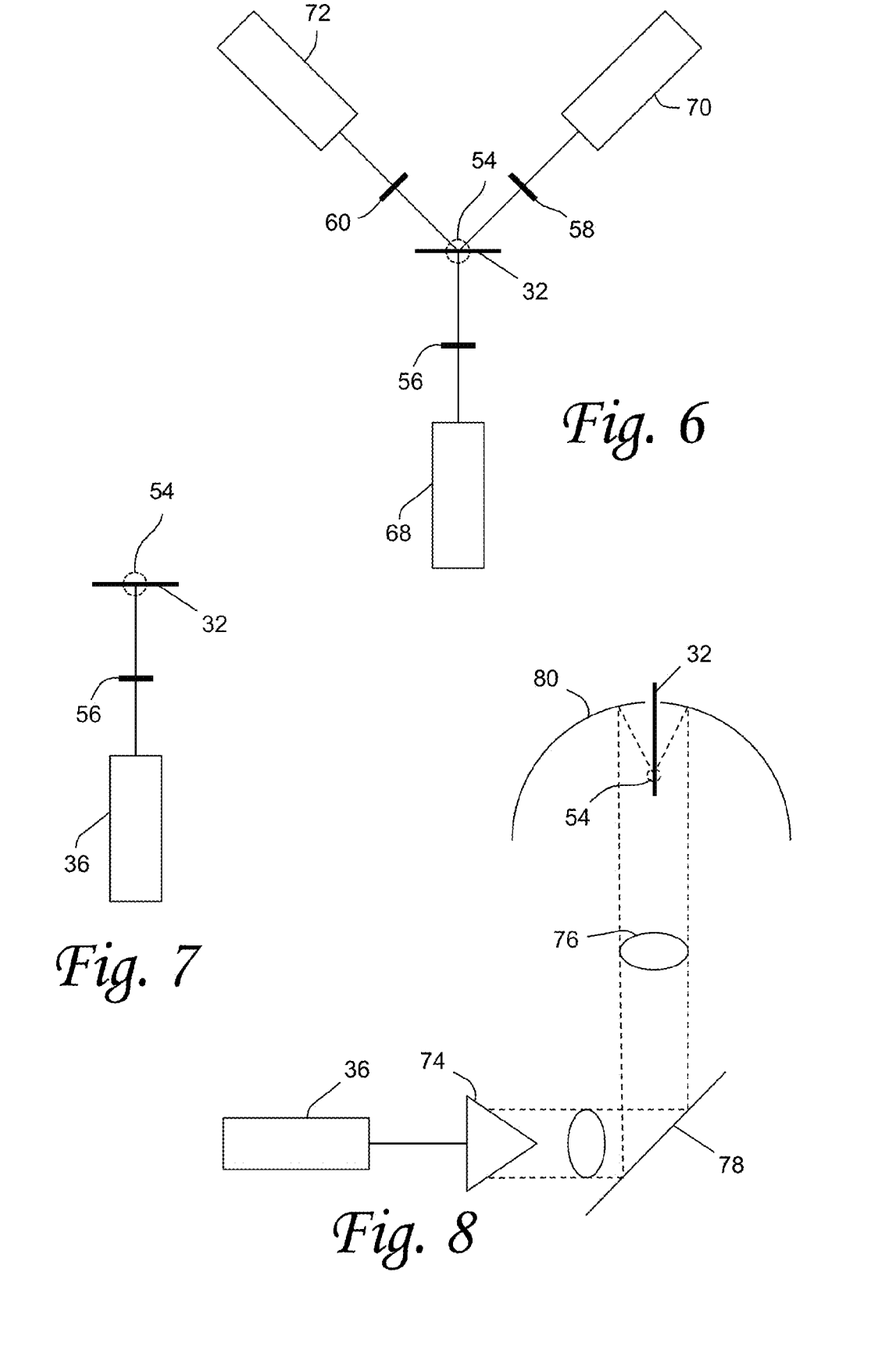
FIG. 6 is a schematic diagram of an alternate laser configuration for sintering the green fiber in FIG. 1.
FIG. 7 is a schematic diagram of another laser configuration for sintering the green fiber in FIG. 1.
FIG. 8 is a schematic diagram of still another laser configuration for sintering the green fiber in FIG. 1.

One or more continuous wave lasers may be utilized in other embodiments, such as those illustrated in the schematic diagrams of FIGS. 6 and 7. Multiple lasers 68-72 may be used in place of the optics of FIG. 5 as seen in FIG. 6, or the majority of the optics may be eliminated with a single laser 36 configuration as illustrated in the schematic in FIG. 7. Alternatively other methods may be employed, such as configurations used with laser heated pedestal growth as illustrated in the schematic diagram in FIG. 8 where laser 36 directs a beam to axicon 74 generating a circular pattern 76. The circular beam pattern 76 may be reflected off of reflecting mirror 78, in some embodiments, toward a focusing mirror 80, which focuses the circular pattern 76 on the beam spot 54 in order to sinter fiber 32. The configuration just described is similar to that used by Laser Heated Pedestal Growth (LHPG) for growing single crystal fibers. While the LHPG configuration is usually used to melt the material in order to create a single crystal, in embodiments of the invention where the lasers are used for sintering, the temperature of the beam spot 54 in FIG. 8 is always kept below the melting point of the fiber 32, but hot enough for the sintering process. Lasers other than continuous wave lasers may also be used depending on the composition of the green fibers and the ceramics used, such as lutetia, YAG, Scandia, or Yttria, for example. The sintering process results in fibers that are better than 99 percent dense with impurities on the order of parts per million, which assists in reducing scatter and loss.

Figure 9:
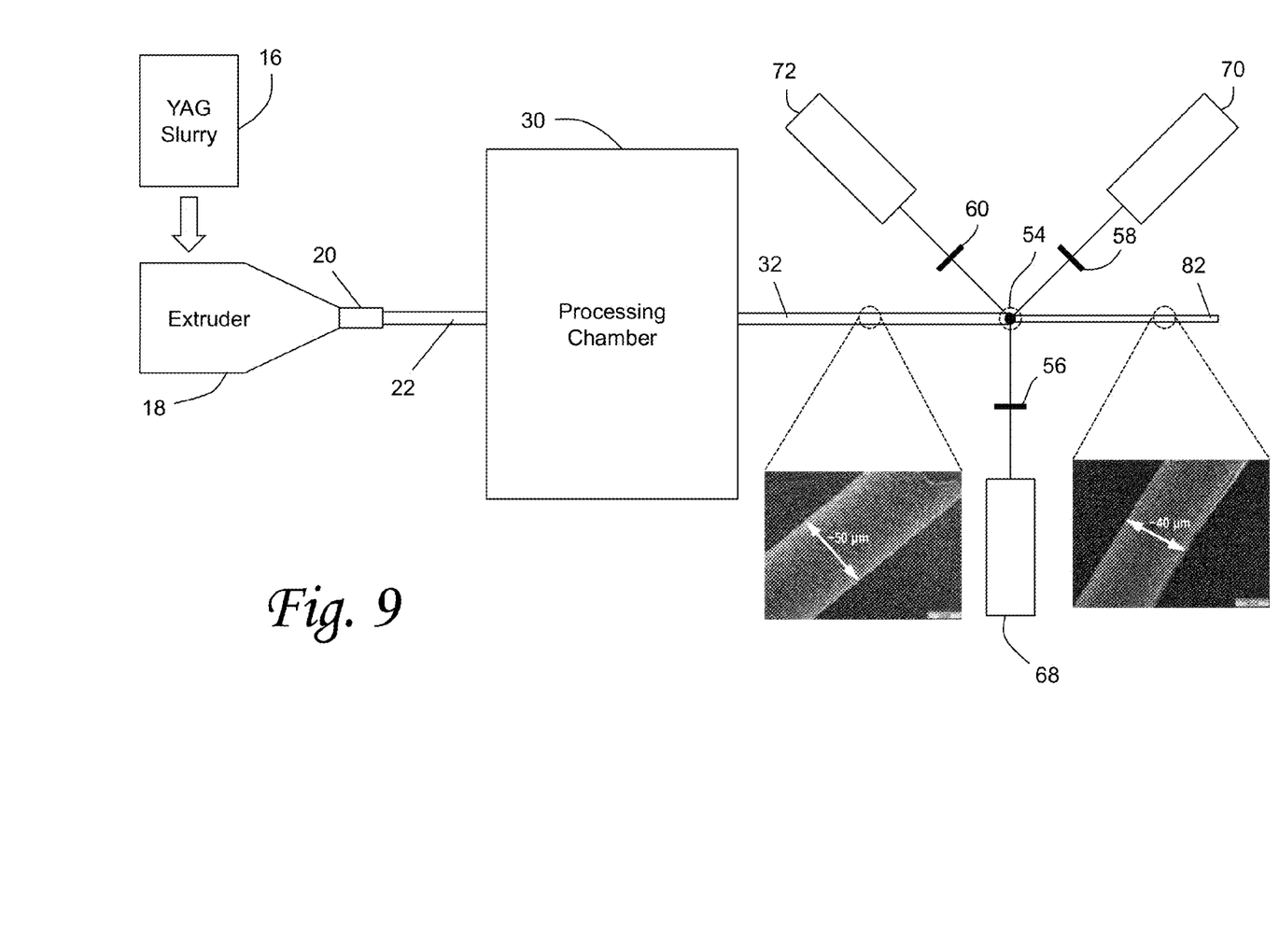
FIG. 9 is a schematic diagram of an embodiment of a system that could be used for a continuous fiber production.

Since the green fiber 32 is being moved through the laser spot 54, the components set forth above may be used together in order to form a continuous YAG fiber, rather than fibers of set length. Turning now to the embodiment illustrated in the schematic diagram in FIG. 9, the process again begins with a YAG slurry 16, which as set forth above may consist of YAG nanopower 10, a binder 12, and a liquid 14. The slurry may then be fed into the extruder 18 which extrudes a green fiber 22 from die 20. As set forth above, the diameter of the green fiber may be determined based on the die, which also affects the extrusion pressure. The green fiber 22 may then be sent through a processing chamber 30 to remove any of the fluid or binder materials. Processing chamber 30 may be a single chamber or multiple chambers depending on the requirements for eliminating both the liquid and binding agent. After passing through the processing chamber 30, the green fiber 32 may then be directed through the laser spot 54 for sintering. The laser configuration may include any number of lasers and appropriate optics as discussed above. The resulting sintered YAG fiber 82 may then coiled or otherwise cut to desired lengths for laser and other applications utilizing optical fibers.

Figure 10:
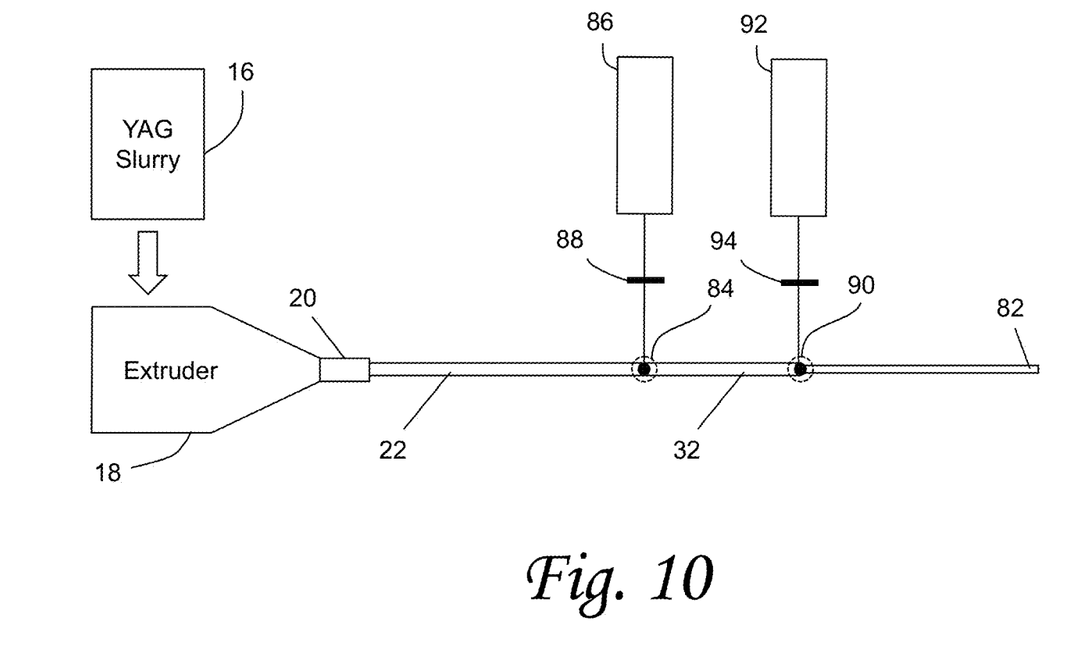
FIG. 10 is a schematic diagram of an alternate embodiment of a system that could be used for a continuous fiber production.

In an alternate embodiment for continuous extrusion, as illustrated in the schematic diagram of FIG. 10, the process again begins with a YAG slurry 16, which as set forth above may consist of YAG nanopower 10, a binder 12, and a liquid 14. The slurry may then be fed into the extruder 18 which extrudes a green fiber 22 from die 20. As set forth above with the other embodiment, the diameter of the green fiber may be determined based on the die, which also affects the extrusion pressure. The green fiber 22 may then be passed through a first laser spot 84 produced by a first laser 86 using appropriate optics 88. This first laser 86 may be used in place of the processing chamber 30 in the embodiment above, calcining the fiber 22 eliminating both the liquid and binding agent, though other embodiments may employ a combination of a processing chamber 30 and the first laser 86. After passing through the first laser spot 84, the green fiber 32 may then be directed through a second laser spot 90 for sintering. The second laser spot 90 may be produced by a second laser 92 using appropriate optics 94. In other variations of this embodiment, either of the laser configurations may include any number of lasers and appropriate optics as discussed above. The resulting sintered YAG fiber 82 may then be coiled or otherwise cut to desired lengths for laser and other applications utilizing optical fibers.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A method of generating an optical fiber, the method comprising:
creating a green fiber consisting primarily of a ceramic material; and
sintering the green fiber with a laser by moving the green fiber through a beam of the laser to increase the density of the fiber after sintering.

2. The method of claim 1, wherein the density of the fiber after sintering is greater than 99 percent dense.

3. The method of claim 1, wherein creating the green fiber comprises:
spinning a viscous preceramic polymer/nanopowder mixture to create the green fiber.

4. The method of claim 1, wherein creating the green fiber comprises:
creating a slurry including the ceramic material; and
extruding the slurry through an die to create the green fiber.

5. The method of claim 4, wherein the slurry comprises:
a ceramic nanopower;
a binder; and
a liquid.

6. The method of claim 5, wherein the binder is a polyethylenimine.

7. The method of claim 5, further comprising:
prior to sintering the green fiber, processing the green fiber to remove the binder and the liquid.

8. The method of claim 1, wherein the laser is a first laser, the method further comprising:
sintering the green fiber with a second laser by moving the green fiber through a laser spot including the beam of the first laser and a beam of the second laser.

9. The method of claim 1, wherein a portion of the green fiber is held in the beam of the laser for an amount of time to sinter the portion of the green fiber before moving a next portion of the green fiber into the beam of the laser.

10. The method of claim 9, wherein the amount of time is approximately one minute.

11. The method of claim 1, wherein the green fiber is continuously moved through the beam of the laser at a rate sufficient to sinter the green fiber.

12. The method of claim 1, wherein the ceramic material comprises YAG.

13. The method of claim 12, wherein the ceramic material further comprises a dopant.

14. A system for creating a continuous optical fiber, the system comprising:
an extruder configured to extrude a ceramic slurry as a green fiber;
a processing chamber configured to receive the green fiber; and
a laser configured to direct a laser spot on the green fiber exiting the processing chamber to sinter the green fiber.

15. The system of claim 14, wherein the laser is further configured to direct a laser spot on the green fiber to sinter the fiber to a density of greater than 99 percent dense.

16. The system of claim 14, wherein the ceramic slurry includes a ceramic nanopower, a binder, and a liquid, and further wherein the processing chamber is configured to:
process the green fiber to remove the binder and the liquid.

17. The system of claim 14, wherein the ceramic slurry include a ceramic nanopower, a polyethylenimine binder, and a liquid, and further wherein the processing chamber is configured to:
process the green fiber to remove the binder and the liquid.

18. The system of claim 14, wherein the laser is a first laser, the system further comprising:
a second laser configured to direct a laser spot in conjunction with laser spot of the first laser on the green fiber exiting the processing chamber to sinter the green fiber.

19. A system for creating a continuous optical fiber, the system comprising:

an extruder configured to extrude a ceramic slurry as a green fiber;
a first laser configured to direct a first laser spot on the green fiber exiting the extruder and further configured to create a first temperature for calcining the green fiber; and
a second laser configured to direct a second laser spot on the green fiber after calcining and further configured to create a second temperature for sintering the green fiber.

20. The system of claim 19, wherein the second laser is further configured to direct a laser spot on the calcined green fiber to sinter the fiber to a density of greater than 99 percent dense.

21. The system of claim 19, the system further comprising:
a third laser configured to direct a laser spot in conjunction with second laser spot of the second laser on the green fiber for sintering the green fiber.

* * * * *